(12) United States Patent
Li et al.

(10) Patent No.: US 7,918,590 B1
(45) Date of Patent: Apr. 5, 2011

(54) COMPOSITE LENS PLATE

(75) Inventors: Yu-Chin Li, Taoyuan County (TW); Po-Liang Huang, Taipei County (TW)

(73) Assignee: Leotek Electronics Corporation, Taoyuan County (TW)

( * ) Notice: Subject to any disclaimer, the term of this patent is extended or adjusted under 35 U.S.C. 154(b) by 0 days.

(21) Appl. No.: 12/559,180

(22) Filed: Sep. 14, 2009

(51) Int. Cl.
*F21V 5/00* (2006.01)

(52) U.S. Cl. .................. 362/311.02; 362/545; 362/522; 362/800

(58) Field of Classification Search .......................... None
See application file for complete search history.

(56) References Cited

U.S. PATENT DOCUMENTS

| | | | |
|---|---|---|---|
| 5,893,633 A * | 4/1999 | Uchio et al. | 362/244 |
| 2003/0123254 A1 * | 7/2003 | Brass et al. | 362/231 |
| 2005/0065798 A1 * | 3/2005 | Kunstler | 705/1 |
| 2006/0083016 A1 * | 4/2006 | Okamura et al. | 362/545 |

\* cited by examiner

*Primary Examiner* — Laura Tso (74) *Attorney, Agent, or Firm* — Tim Tingkang Xia; Morris, Manning & Martin, LLP (57) ABSTRACT

A composite lens plate is applied in a light emitting diode (LED) lighting device having a plurality of LEDs. The composite lens plate includes a plurality of refractive elements. The refractive elements are one-to-one corresponding to the LEDs and guide light emitted by the corresponding LEDs. Each refractive element has a refractive property. The refractive elements are classified into at least two types of lenses according to the refractive property. Lenses of the same type have substantially the same refractive property, and the refractive property of lenses of one type is different from the refractive property of lenses of another type.

19 Claims, 13 Drawing Sheets

COMPOSITE LENS PLATE

BACKGROUND OF THE INVENTION

1. Field of Invention

The present invention relates to a lens plate, and more particularly to a composite lens plate.

2. Related Art

With the increasing concern about energy saving and reduction of $CO_2$ emission, many electrical appliances gradually develop toward high efficiency and low energy consumption. Especially, various lighting devices have developed from tungsten lamps and fluorescent lamps used in the past to currently adopted light emitting diodes (LEDs). Due to its small volume, high luminance, long service life, low power consumption and other properties, the LED has become a new generation lighting device. For example, in Taiwan, all traffic lights use LED lighting devices. Since an LED lighting device includes many LEDs, the traffic lights can achieve a warning effect even if several LEDs fail.

In addition to the application in the traffic lights, the LED lighting devices are also commonly used in street lamps. When applied in street lamps, the LED lighting devices need to meet the requirements for high luminance, low power consumption, particular illumination range (also referred to as light distributions), and the like. For the particular illumination range, different local governments have different regulations on light distributions generated by the street lamps. Here, the so-called light distributions refers to an illumination range formed by light projected from a lighting device on a road surface.

Several methods are usually used to enable an LED lighting device to meet the requirement for a particular light distributions. In a first method, a lens plate is disposed in front of the LED lighting device, so as to refract light emitted by all LEDs to a predetermined position. In a second method, LEDs are properly arranged so as to achieve a required light distributions. In the above two methods, when meeting the requirements for different light distributions, at least one mold needs to be designed for each light distributions, so as to fabricate a lens required by the light distributions. Therefore, when bidding for the manufacturing of street lamps for different road sections, a manufacturer needs to design different molds, which increases the cost and is not economical.

SUMMARY OF THE INVENTION

Accordingly, the present invention is a composite lens plate applied in an LED lighting device.

In an embodiment of the present invention, the composite lens plate is applied in an LED lighting device having a plurality of LEDs. The composite lens plate comprises a substrate and a plurality of refractive elements. The refractive elements are disposed on the substrate and one-to-one corresponding to the LEDs. The refractive elements guide light emitted by the corresponding LEDs. Each refractive element has a refractive property. The refractive elements are classified into at least two types of lenses according to the refractive property. The refractive elements of lenses of the same type have substantially the same refractive property. The refractive property of the refractive elements of lenses of one type is substantially different from the refractive property of the refractive elements of lenses of another type.

In another embodiment of the present invention, the refractive elements are classified into three types of lenses according to the refractive property. The lenses comprise a first type of lenses, a second type of lenses, and a third type of lenses. The first type of lenses, the second type of lenses, and the third type of lenses have different refractive properties.

A major-axis refraction angle of the refractive elements of the first type of lenses is 135° to 175°, and a minor-axis refraction angle of the refractive elements of the first type of lenses is 75° to 105°. A major-axis refraction angle of the refractive elements of the second type of lenses is 105° to 135°, and a minor-axis refraction angle of the refractive elements of the second type of lenses is 50° to 75°. A major-axis refraction angle of the refractive elements of the third type of lenses is 75° to 105°, and a minor-axis refraction angle of the refractive elements of the third type of lenses is 30° to 50°.

In the present invention, through the combination and arrangement of the above refractive elements, light emitted by the LEDs can form different light distributions after passing through the composite lens plate.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The composite lens plate of the present invention is applied in an LED lighting device having a plurality of LEDs. The lens plate is used for adjusting a light distributions formed by light emitted by the LEDs. Particularly, the lens plate is applied in LED street lamps. Since many countries have regulations on the luminance and illumination range of street lamps, a manufacturer needs to fabricate corresponding lens plates for different areas, so as to comply with the regulations.

Figure 1:
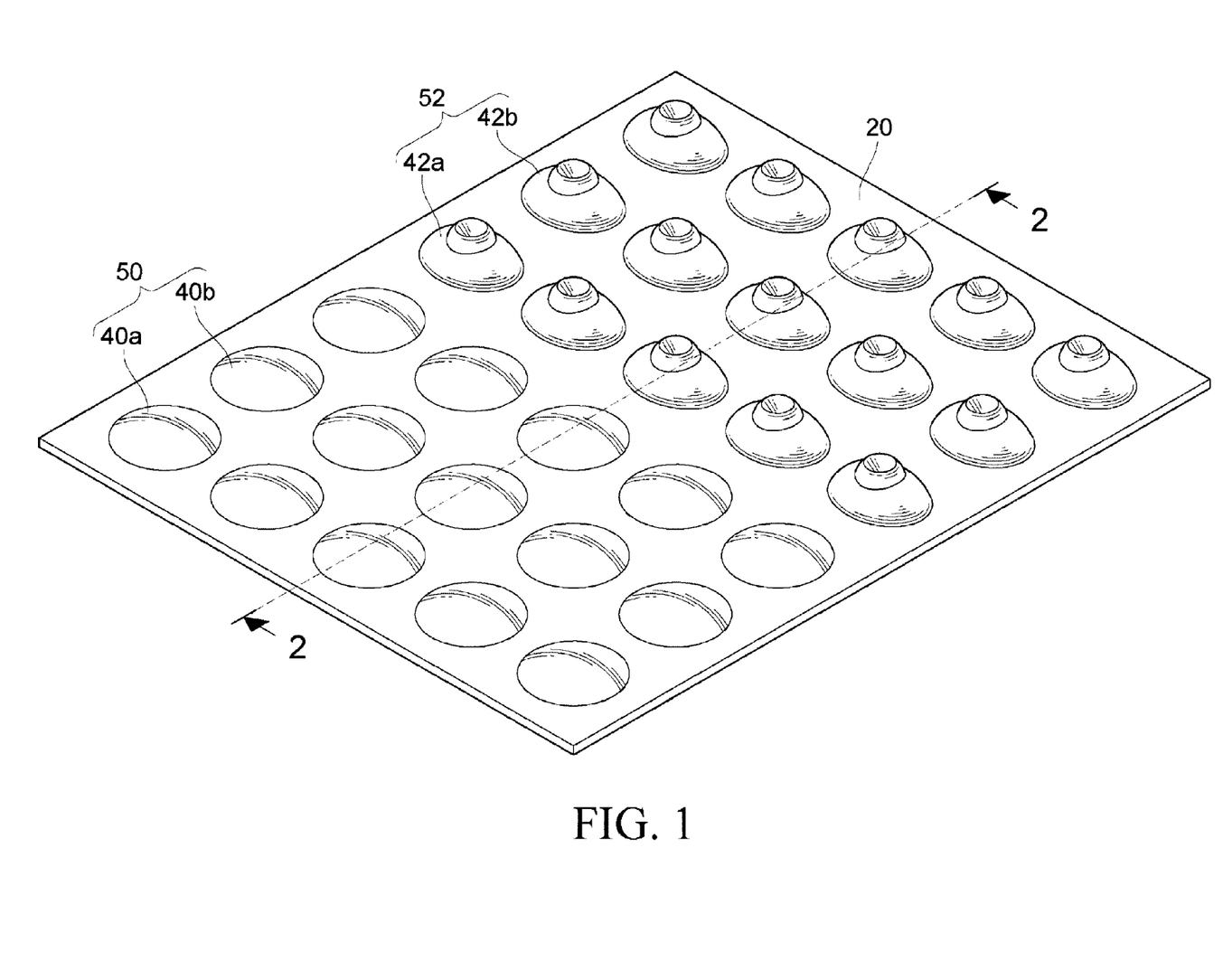
FIG. 1 is a schematic three-dimensional view of a composite lens plate according to an embodiment of the present invention.

FIG. 1 is a schematic three-dimensional view of a composite lens plate according to an embodiment of the present invention. Referring to FIG. 1, a composite lens plate 20 comprises a substrate 30 and a plurality of refractive elements 40a, 40b, 42a, 42b. The refractive elements 40a, 40b, 42a, 42b are disposed on the substrate 30 and one-to-one corresponding to the LEDs (to be detailed below). The refractive elements 40a, 40b, 42a, 42b guide light emitted by the corresponding LEDs. Each refractive element has a refractive property (to be detailed below). The refractive elements are classified into at least two types of lenses 50, 52 according to the refractive property. The refractive elements 40a, 40b of the lenses 50 (referred to as a first type of lenses below) have substantially the same refractive property. The refractive property of the refractive elements 40a, 40b of the lenses 50 is substantially different from the refractive property of the refractive elements 42a, 42b of the lenses 52 (referred to as a second type of lenses below).

Figure 2:
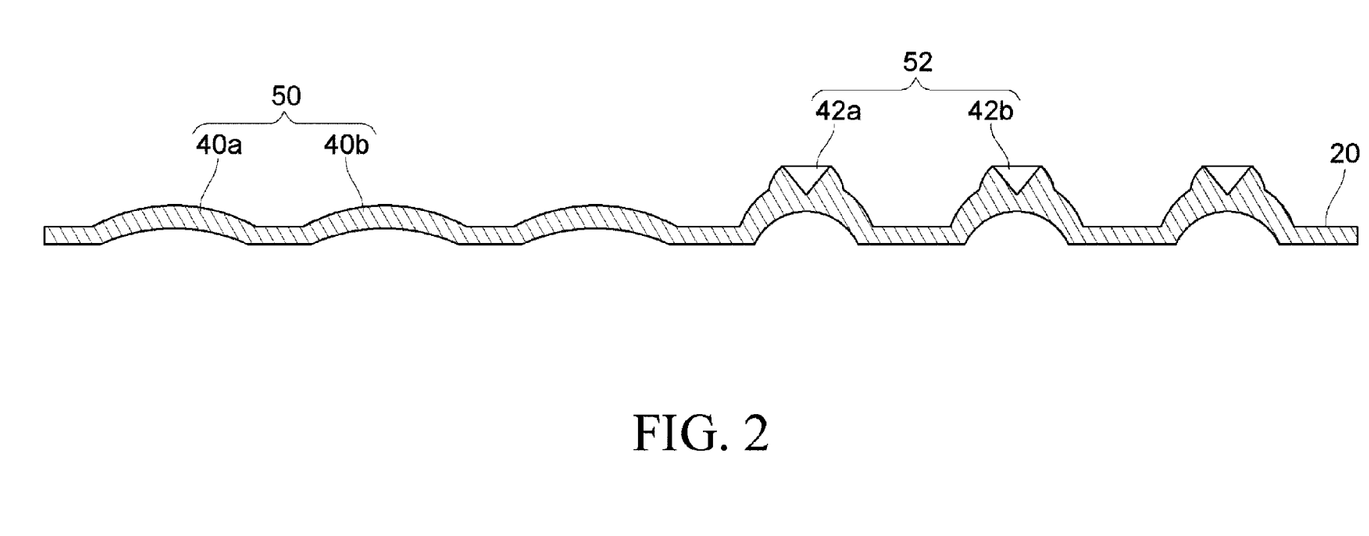
FIG. 2 is a schematic cross-sectional view taken along Line 2-2 in FIG. 1.
Figure 3A:
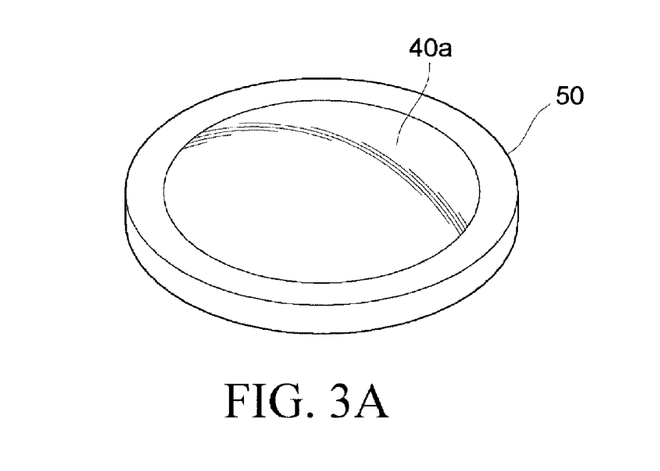
FIG. 3A is a schematic plan view of a refractive element of a lens of the first type according to the present invention.
Figure 3B:
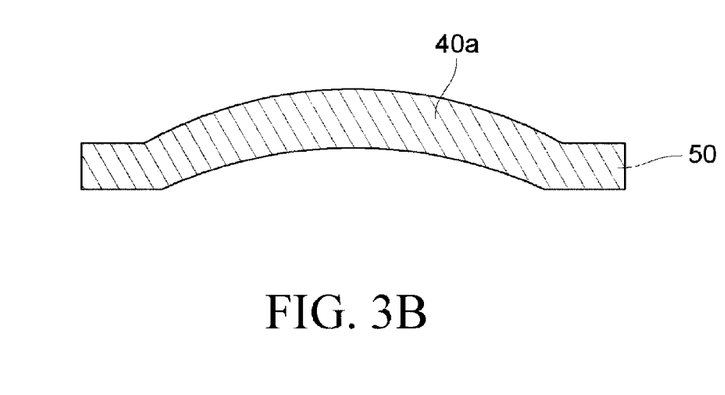
FIG. 3B is a schematic cross-sectional view taken along Line 3B-3B in FIG. 3A.
Figure 4A:
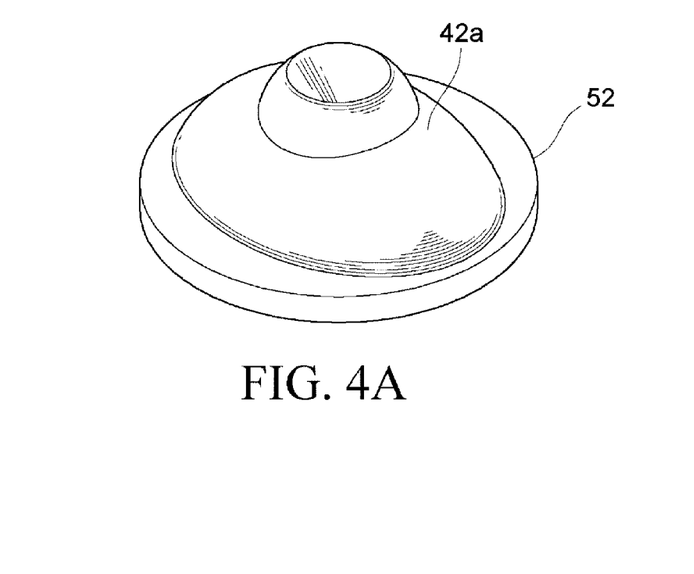
FIG. 4A is a schematic three-dimensional view of a refractive element of a lens of the first type according to the present invention.
Figure 4B:
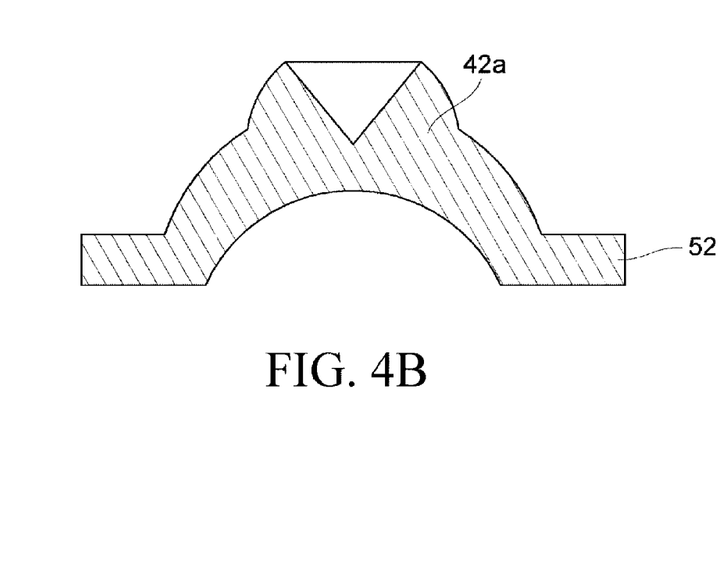
FIG. 4B is a schematic cross-sectional view taken along Line 4B-4B in FIG. 4A.

FIG. 2 is a schematic cross-sectional view taken along Line 2-2 in FIG. 1. As can be seen from FIG. 2, the refractive elements 40a, 40b of the first type of lenses 50 have substantially the same cross-sectional shape. The refractive elements 42a, 42b of the second type of lenses 52 have substantially the same cross-sectional shape. The cross-sectional shape of the refractive elements of the first type of lenses is substantially different from the cross-sectional shape of the refractive elements of the second type of lenses. For detailed structures of the refractive elements 40a, 40b of the first type of lenses 50 and the refractive elements 42a, 42b of the second type of lenses 52, reference is made to FIGS. 3A, 3B, 4A, and 4B. As can be seen from FIGS. 3A and 3B, surfaces of the refractive elements 40a of the first type of lenses 50 are each an elliptical curved surface. The curvature of the curved surface may be designed according to a light distributions generated by the LEDs. As can be seen from FIGS. 4A and 4B, surfaces of the refractive elements 42a of the second type of lenses 52 are each an elliptical curved surface having a cone-shaped concave top end.

Figure 5:
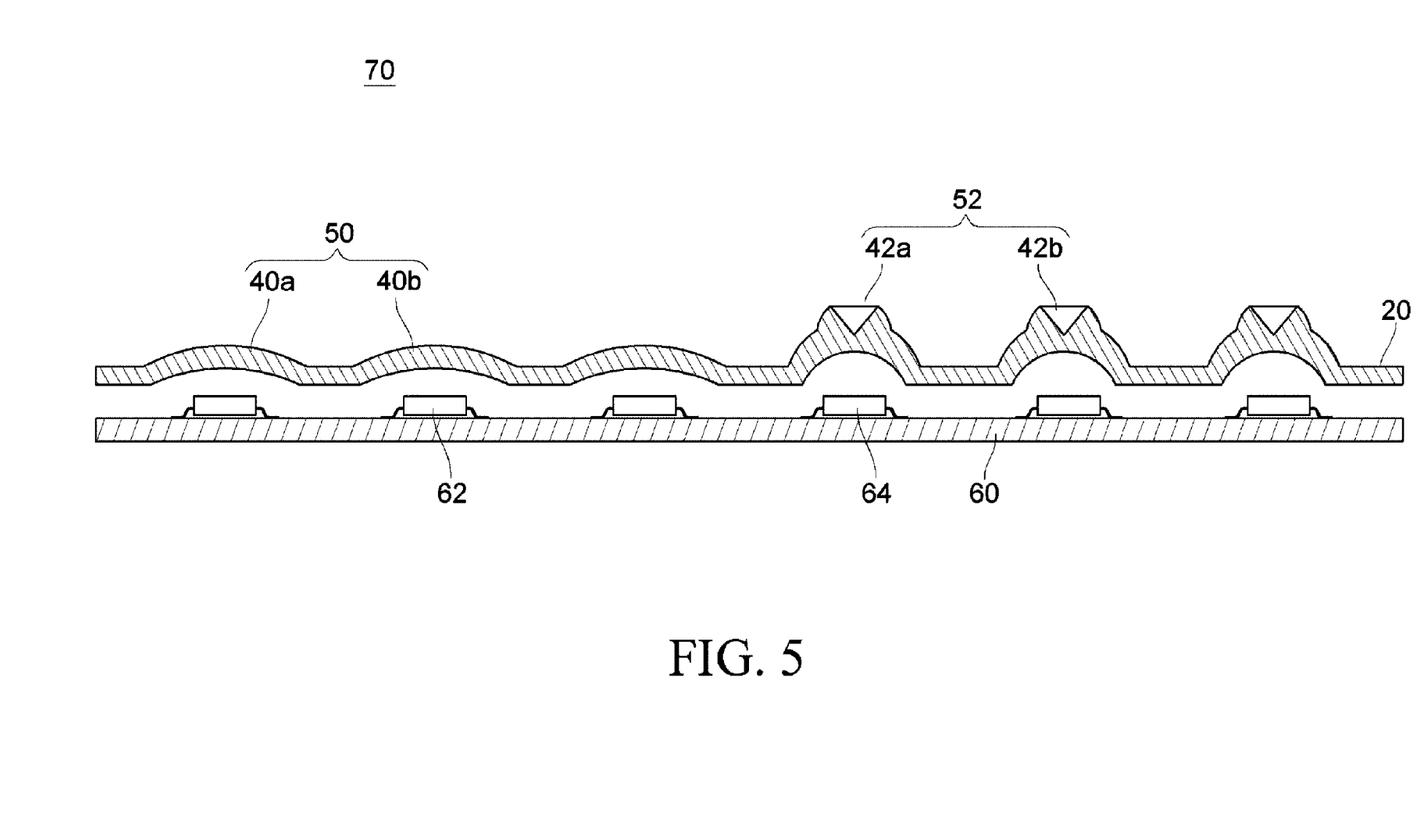
FIG. 5 is a schematic cross-sectional view of an LED lighting device applying an embodiment of the present invention.

FIG. 5 is a schematic cross-sectional view of an LED lighting device 70 applying an embodiment of the present invention. Referring to FIG. 5, the LED lighting device 70 comprises a circuit board 60 and a composite lens plate 20. The composite lens plate 20 is disposed on the circuit board 60. The circuit board 60 has a plurality of LEDs 62, 64. The optical axis of each of LEDs 62,64 is perpendicular to the surface of the circuit board 60 where the LEDs 62, 64 are disposed. The refractive elements 40a, 40b, 42a, 42b are one-to-one corresponding to the LEDs 62, 64, and the optic axis of each of LEDs 62,64 is parallel to the optic axis of each of the refractive elements 40a, 40b, 42a, 42b, respectively.

As can be seen from FIG. 5, since the shape of the refractive elements 40a, 40b of the first type of lenses 50 is different from that of the refractive elements 42a, 42b of the second type of lenses 52, light emitted by the LEDs 62, 64 is refracted to form different light distributions after passing through the first type of lenses 50 and the second type of lenses 52 (which is the refractive property as described above).

Figure 6:
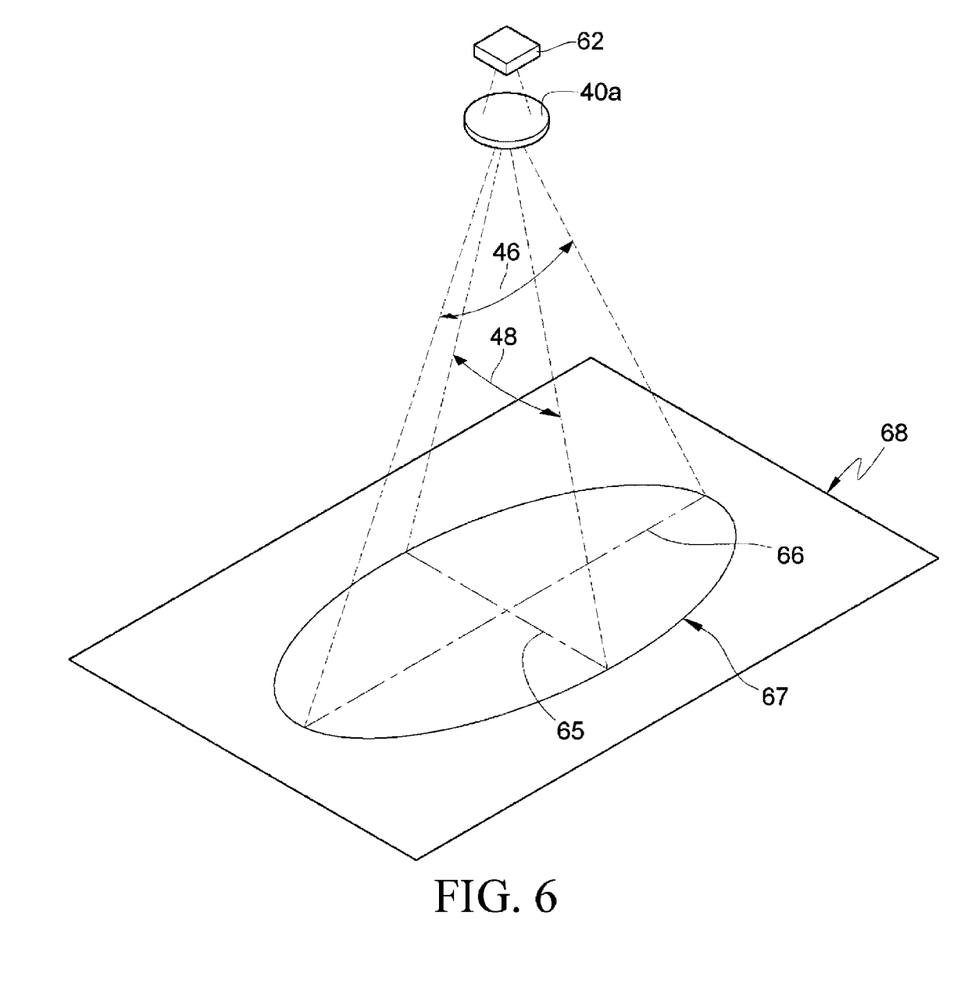
FIG. 6 is a schematic view of a refractive property according to an embodiment of the present invention.

For the illustration of the refractive property, reference is made to FIG. 6. FIG. 6 is a schematic view of a refractive property according to an embodiment of the present invention. As can be seen from FIG. 6, light emitted by the LED 62 passes through the refractive element 40a, and then forms an elliptical light distributions 67 on a projection surface 68 at a particular distance there-from. In practical applications, the light distributions 67 is not exactly elliptical, but instead, is somewhat elliptical. Meanwhile, different positions (areas inside the ellipse) may have different light intensities. The light distributions 67 has a major axis 66 and a minor axis 65. In this figure, an angle between two dashed lines connecting the refractive element 40a with two ends of the major axis 66 is a major-axis refraction angle 46, and an angle between two dashed lines connecting the refractive element 40a with two ends of the minor axis 65 is a minor-axis refraction angle 48. That is to say, the above refractive property comprises a major-axis refraction angle 46 and a minor-axis refraction angle 48.

The major-axis refraction angle 46 of the refractive elements 40a, 40b of the first type of lenses 50 may be 135° to 175°, and preferably 140° to 160°. The minor-axis refraction angle 48 of the refractive elements 40a, 40b of the first type of lenses 50 may be 75° to 105°, and preferably 80° to 100°.

The major-axis refraction angle 46 of the refractive elements 42a, 42b of the second type of lenses 52 may be 105° to 135°, and preferably 110° to 130°. The minor-axis refraction angle 48 of the refractive elements 42a, 42b of the second type of lenses 52 may be 50° to 75°, and preferably 45° to 65°.

Figure 7:
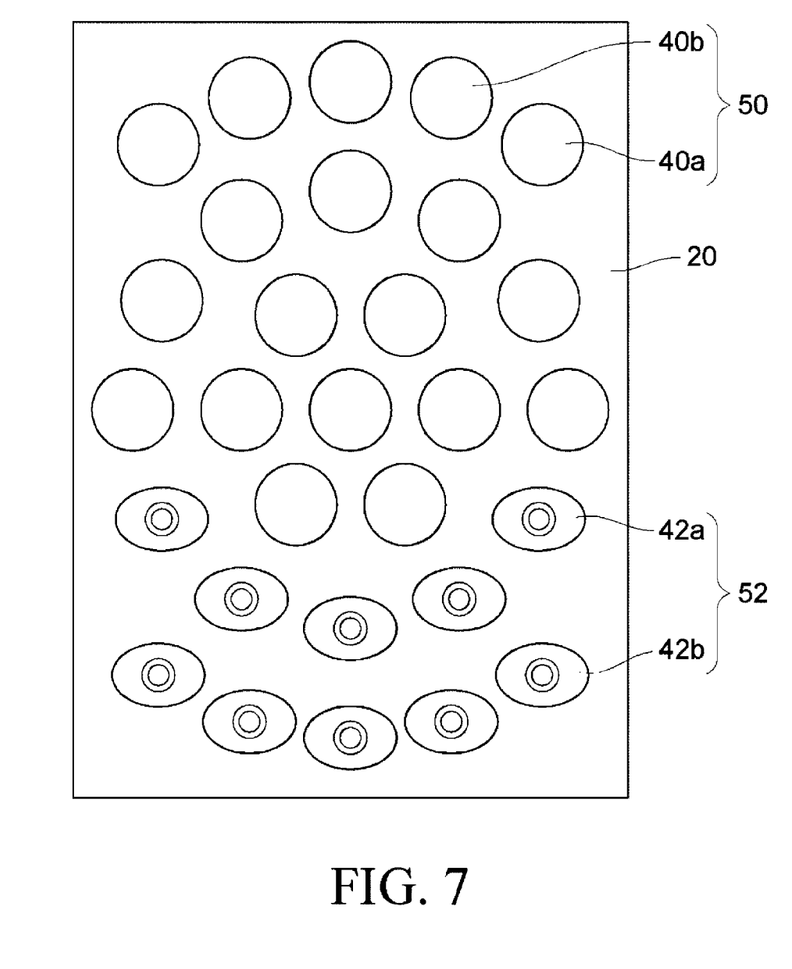
FIG. 7 is a schematic view of a configuration of refractive elements according to an embodiment of the present invention.

Next, the refractive elements 40a, 40b, 42a, 42b are arranged on the substrate 30 corresponding to the LEDs 62, 64. Variations may also be made to the arrangement of the refractive elements and the LEDs. Referring to FIG. 7, the refractive elements 40a, 40b, 42a, 42b are arranged on the substrate 30 approximately in the form of a ring. Definitely, corresponding to this embodiment, the LEDs 62, 64 are also arranged in the same manner. Although the arrangement of the refractive elements 40a, 40b, 42a, 42b has been illustrated by taking the above two manners (in the form of an array or a ring) as examples, the present invention is not limited thereto, and the refractive elements 40a, 40b, 42a, 42b may also be arranged in other manners, for example, approximately in a T-shaped or an I-shaped manner.

Figure 8A:
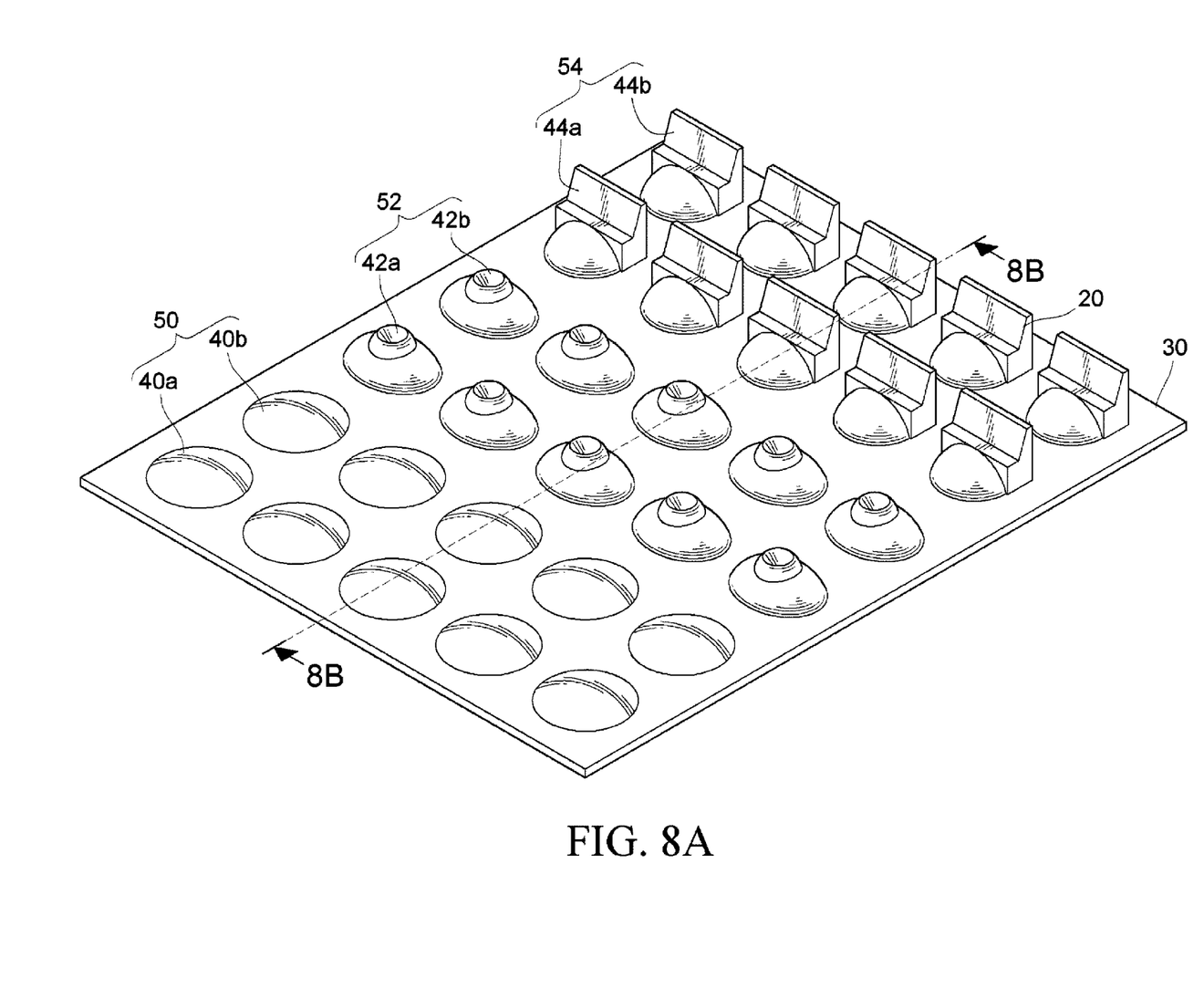
FIG. 8A is a schematic three-dimensional view of a lens plate according to another embodiment of the present invention.
Figure 8B:
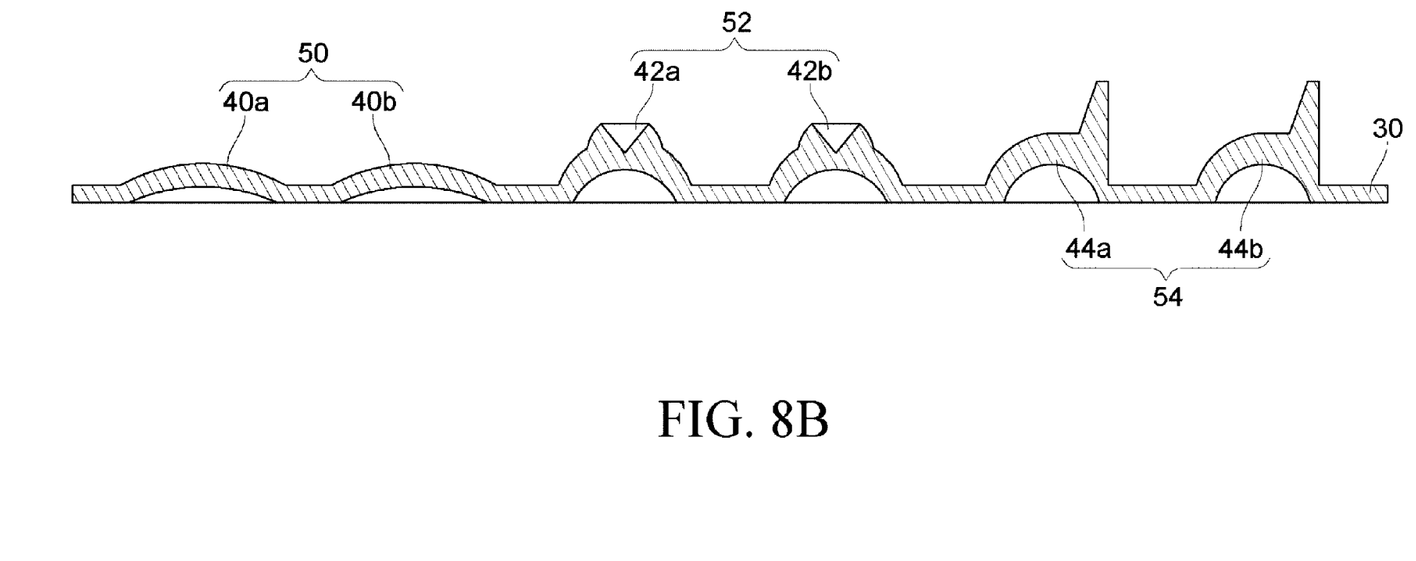
FIG. 8B is a schematic cross-sectional view taken along Line 8B-8B in FIG. 8A.

FIG. 8A is a schematic three-dimensional view of a lens plate according to another embodiment of the present invention. FIG. 8B is a schematic cross-sectional view taken along Line 8B-8B in FIG. 8A. Referring to FIGS. 8A and 8B, the refractive elements 40a, 40b, 42a, 42b, 44a, 44b are classified into three types of lenses 50, 52, 54 according to the refractive property. The lenses 50, 52, 54 comprise a first type of lenses 50, a second type of lenses 52, and a third type of lenses 54. The first type of lenses 50, the second type of lenses 52, and the third type of lenses 54 have different refractive properties.

The major-axis refraction angle of the refractive elements 44a, 44b of the third type of lenses 54 is 75° to 105°, and preferably 85° to 95°. The minor-axis refraction angle of the refractive elements 44a, 44b of the third type of lenses 54 is 30° to 50°, and preferably 35° to 45°. Surfaces of the refractive elements 44a, 44b of the third type of lenses 54 are each a combination of a semi-elliptical curved surface and a columnar body. Since the refractive elements 44a, 44b of the third type of lenses have surfaces of the columnar body, an asymmetrical light distributions is formed (to be detailed below).

Although the refractive properties of the refractive elements 40a, 40b, 42a, 42b, 44a, 44b have been enumerated above, the present invention is not limited thereto. Meanwhile, the number of types of lenses obtained by classifying the refractive elements 40a, 40b, 42a, 42b, 44a, 44b according to the refractive property is not limited to three, but may also be four or more.

Figure 9A:
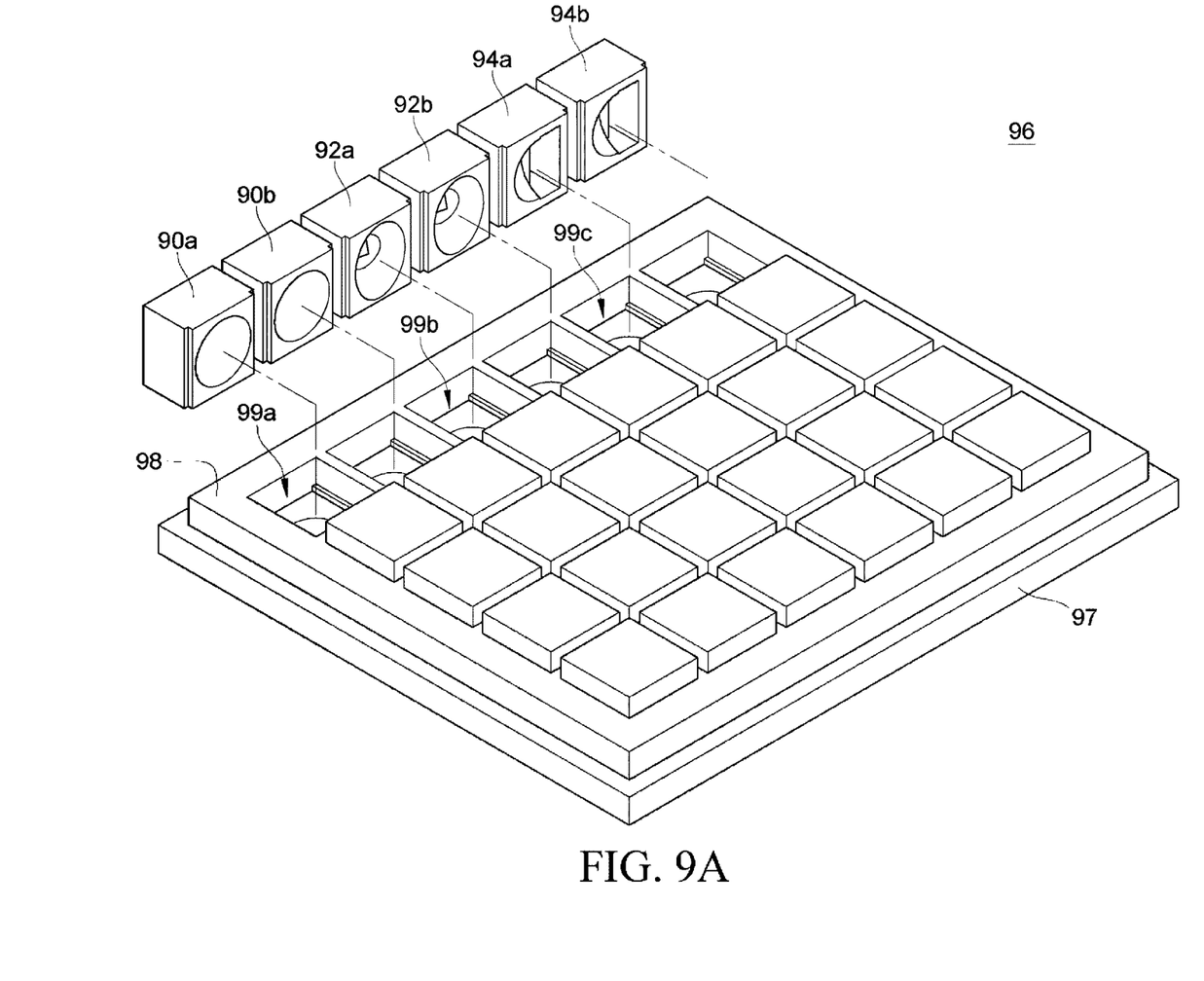
FIG. 9A is a schematic three-dimensional view of a mold for the lens plate according to the embodiment of the present invention in FIG. 8A.
Figure 9B:
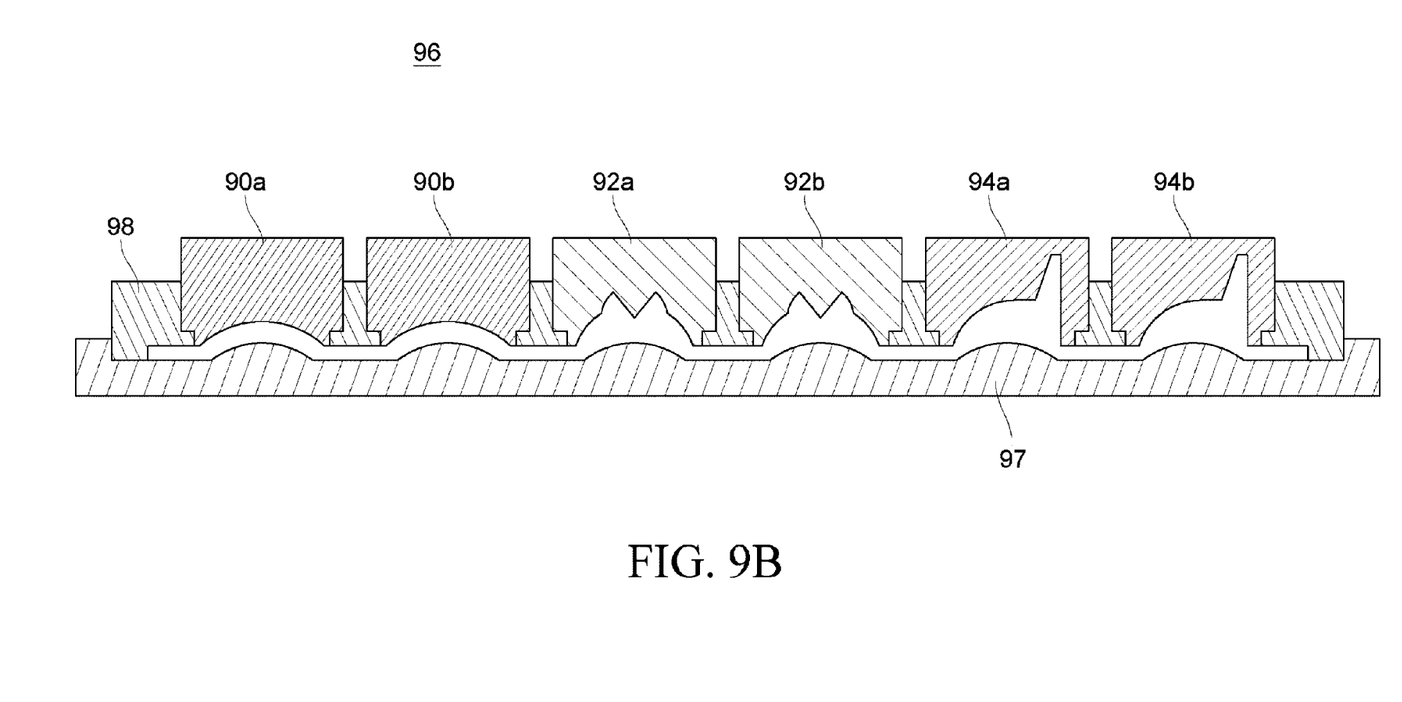
FIG. 9B is a schematic cross-sectional view taken along Line 9B-9B in FIG. 9A.

Finally, for a mold for the lens plate according to the embodiment of the present invention in FIG. 8A, reference is made to FIGS. 9A and 9B. Referring to FIGS. 9A and 9B, a mold 96 comprises a male mold 97, a female mold 98, and mold cores 90a, 90b, 92a, 92b, 94a, 94b. In this embodiment, the female mold 98 has a plurality of openings 99a, 99b, 99c, and each opening 99a, 99b, 99c has the same size as the mold cores 90a, 90b, 92a, 92b, 94a, 94b. The mold cores 90a, 90b, 92a, 92b, 94a, 94b are mounted in the openings 99a, 99b, 99c, and then the female mold 98 mounted with the mold cores 90a, 90b, 92a, 92b, 94a, 94b is combined with the male mold 97, so as to form the mold 96 for the composite lens plate 20 having different refractive elements 96. A manufacturer may select a combination of the mold cores 90a, 90b, 92a, 92b, 94a, 94b as shown in FIG. 9B according to the requirements of different areas, so as to mold a composite lens plate 20 having a corresponding refractive property. In addition to the combination as shown in FIG. 9B, the manufacturer may also select a combination of the mold cores 90a, 90b, 92a, 92b or the mold cores 92a, 92b, 94a, 94b, to mold different composite lens plates 20, so as to meet the requirements for different light distributions.

Figure 10A:
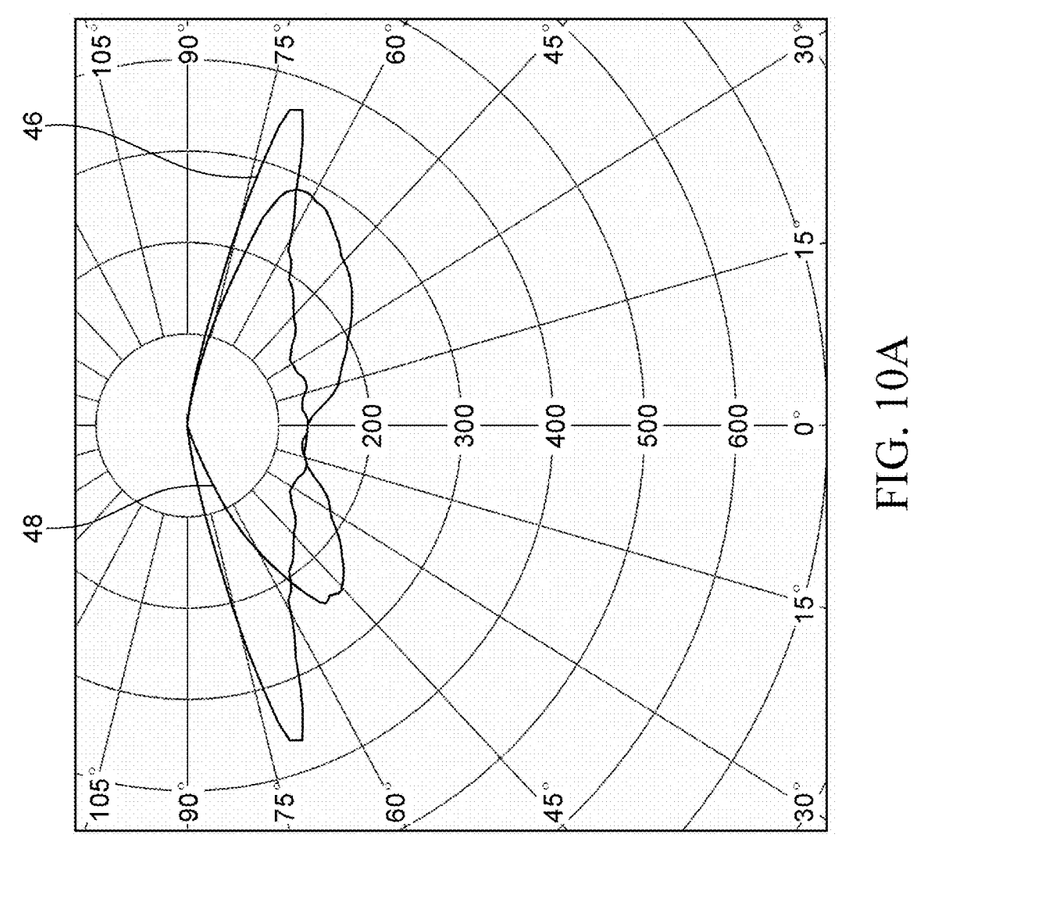
FIG. 10A is a schematic view of a first light distributions generated according to an embodiment of the present invention.
Figure 10B:
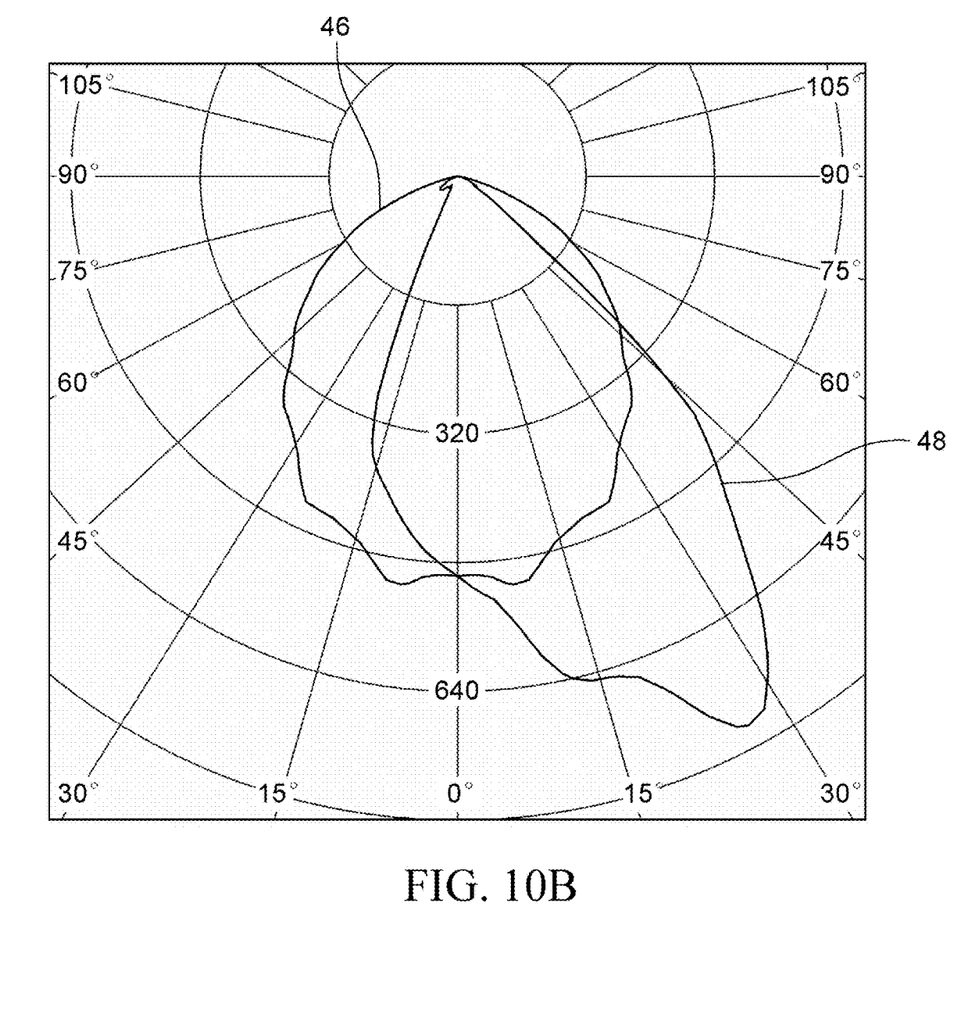
FIG. 10B is a schematic view of a second light distributions generated according to an embodiment of the present invention.
Figure 10C:
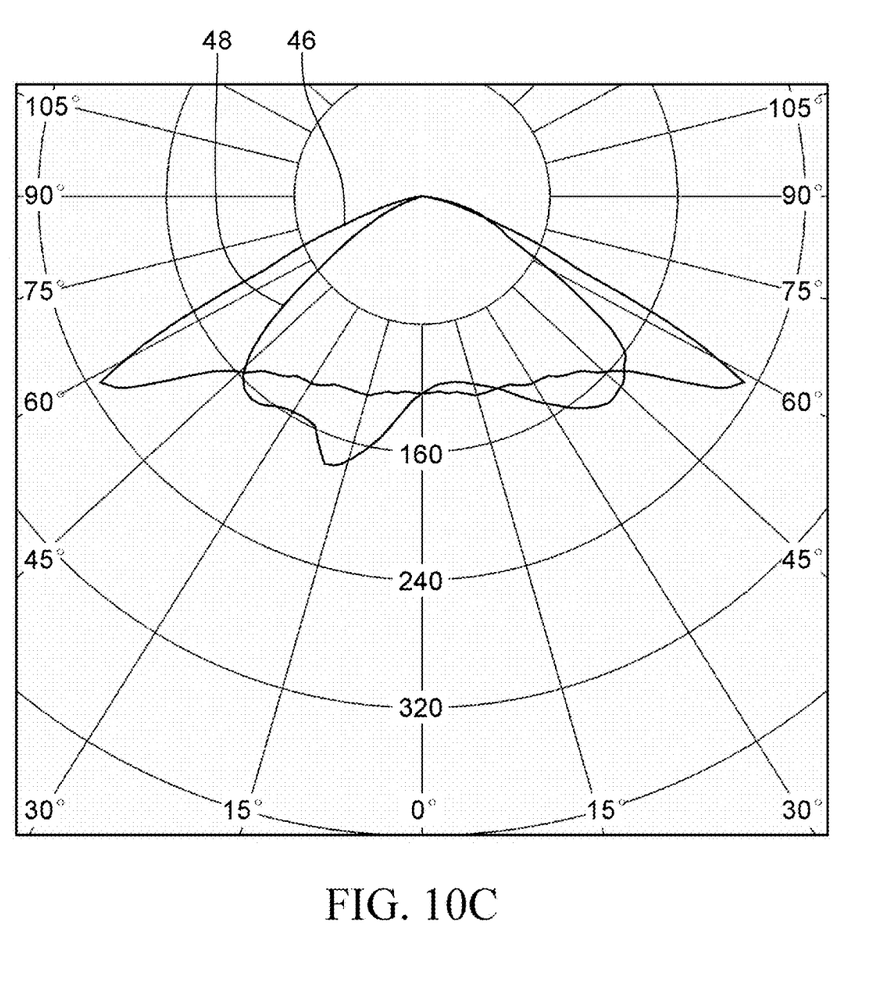
FIG. 10C is a schematic view of a third light distributions generated according to an embodiment of the present invention.

For light distributions generated by different lens combinations, reference is made to FIGS. 10A, 10B, and 10C. FIGS. 10A, 10B, and 10C are schematic views of light distributions generated by different lens combinations according to an embodiment of the present invention, in which the center of concentric circles represents the position of a light source (LEDs), each concentric circle represents a contour line indicating a light intensity (160, 240, or 320 candelas per 1000 lumens (cd/klm), as shown in the figures), and each radial line represents an angle with a vertical line passing through the light source (0°, 15°, 30°, 45°, 60°, 75°, 90°, or 105° as shown in the figures). FIG. 10A shows light intensity profiles obtained when the refractive elements 40a, 40b of the first type of lenses 50 are combined with the refractive elements 44a, 44b of the third type of lenses 54, in which two profiles respectively represent light intensity profiles at the major-axis refraction angle 46 (along the major axis) and at the minor-axis refraction angle 48 (along the minor axis). As can be seen from FIG. 10A, the major-axis refraction angle 46 covers a range of about 75° from the vertical line to the left and about 75° from the vertical line to the right (that is, about 150° in total), and the minor-axis refraction angle 48 covers a range of about 60° from the vertical line to the left and about 70° from the vertical line to the right (that is, about 130° in total).

FIG. 10B shows a light distributions obtained when only the refractive elements 44a, 44b of the third type of lenses 54 are disposed on the substrate 30, and it can be seen from light intensity profiles at the major-axis refraction angle 46 and the minor-axis refraction angle 48 that the light distributions obtained when only the refractive elements 44a, 44b of the third type of lenses 54 are disposed on the substrate 30 is asymmetrical. As can be seen from FIG. 10B, the major-axis refraction angle 46 covers a range of about 60° from the vertical line to the left and about 60° from the vertical line to the right (that is, about 120° in total), and the minor-axis refraction angle 48 covers a range of about 20° from the vertical line to the left and about 45° from the vertical line to the right (that is, about 65° in total).

FIG. 10C shows a light distributions obtained when the refractive elements 42a, 42b of the second type of lenses 52 are combined with the refractive elements 44a, 44b of the third type of lenses 54 and are disposed on the substrate 30. As can be seen from FIG. 10C, the major-axis refraction angle 46 covers a range of about 65° from the vertical line to the left and about 65° from the vertical line to the right (that is, about 130° in total), and the minor-axis refraction angle 48 covers a range of about 50° from the vertical line to the left and about 50° from the vertical line to the right (that is, about 100° in total).

In the present invention, through the combination of the above refractive elements, light emitted by the LED lighting device can form different light distributions after passing through the composite lens plate.

What is claimed is:

1. A composite lens plate, applied in a light emitting diode (LED) lighting device having a plurality of LEDs, the composite lens plate comprising:
    a substrate; and
    a plurality of refractive elements, disposed on the substrate and one-to-one corresponding to the LEDs, wherein each refractive element has a refractive property, the refractive elements are classified into at least two types of lenses according to the refractive property, the refractive elements of lenses of the same type have substantially the same refractive property, the refractive property of the refractive elements of lenses of one type is substantially different from the refractive property of the refractive elements of lenses of another type, the two types of lenses comprise a first type of lenses and a second type of lenses, surfaces of the refractive elements of the first type of lenses are each an elliptical curved surface, and surfaces of the refractive elements of the second type of lenses are each an elliptical curved surface having a cone-shaped concave top end.

2. The composite lens plate according to claim 1, wherein the refractive property comprises a major-axis refraction angle and a minor-axis refraction angle.

3. The composite lens plate according to claim 2, wherein the major-axis refraction angle of the refractive elements of the first type of lenses is 135° to 175°, and the minor-axis refraction angle of the refractive elements of the first type of lenses is 75° to 105°.

4. The composite lens plate according to claim 2, wherein the major-axis refraction angle of the refractive elements of the second type of lenses is 105° to 135°, and the minor-axis refraction angle of the refractive elements of the second type of lenses is 50° to 75°.

5. The composite lens plate according to claim 1, wherein the refractive elements are classified into three types of lenses according to the refractive property, the lenses comprise a first type of lenses, a second type of lenses, and a third type of lenses, and the first type of lenses, the second type of lenses, and the third type of lenses have different refractive properties.

6. The composite lens plate according to claim 5, wherein the refractive property comprises a major-axis refraction angle and a minor-axis refraction angle.

7. The composite lens plate according to claim 6, wherein the major-axis refraction angle of the refractive elements of the first type of lenses is 135° to 175°, and the minor-axis refraction angle of the refractive elements of the first type of lenses is 75° to 105°.

8. The composite lens plate according to claim 7, wherein the major-axis refraction angle of the refractive elements of the second type of lenses is 105° to 135°, and the minor-axis refraction angle of the refractive elements of the second type of lenses is 50° to 75°.

9. The composite lens plate according to claim 7, wherein surfaces of the refractive elements of the third type of lenses are each a combination of a semi-elliptical curved surface and a columnar body.

10. The composite lens plate according to claim 9, wherein the major-axis refraction angle of the refractive elements of the third type of lenses is 75° to 105°, and the minor-axis refraction angle of the refractive elements of the third type of lenses is 30° to 50°.

11. A composite lens plate, applied in a light emitting diode (LED) lighting device having a plurality of LEDs, the composite lens plate comprising:
a substrate; and
a plurality of refractive elements, disposed on the substrate and one-to-one corresponding to the LEDs, wherein each refractive element has a refractive property, the refractive elements are classified into three types of lenses according to the refractive property, the lenses comprise a first type of lenses, a second type of lenses, and a third type of lenses, the first type of lenses, the second type of lenses, and the third type of lenses have different refractive properties, the refractive property comprises a major-axis refraction angle and a minor-axis refraction angle, the major-axis refraction angle of the refractive elements of the first type of lenses is 135° to 175°, the minor-axis refraction angle of the refractive elements of the first type of lenses is 75° to 105°, and surfaces of the refractive elements of the third type of lenses are each a combination of a semi-elliptical curved surface and a columnar body.

12. The composite lens plate according to claim 11, wherein surfaces of the refractive elements of the first type of lenses are each an elliptical curved surface, and surfaces of the refractive elements of the second type of lenses are each an elliptical curved surface having a cone-shaped concave top end.

13. The composite lens plate according to claim 12, wherein the major-axis refraction angle of the refractive elements of the second type of lenses is 105° to 135°, and the minor-axis refraction angle of the refractive elements of the second type of lenses is 50° to 75°.

14. The composite lens plate according to claim 11, wherein the major-axis refraction angle of the refractive elements of the second type of lenses is 105° to 135°, and the minor-axis refraction angle of the refractive elements of the second type of lenses is 50° to 75°.

15. The composite lens plate according to claim 11, wherein the major-axis refraction angle of the refractive elements of the third type of lenses is 75° to 105°, and the minor-axis refraction angle of the refractive elements of the third type of lenses is 30° to 50°.

16. A composite lens plate, applied in a light emitting diode (LED) lighting device having a plurality of LEDs, each of the LEDs having an optic axis, the optic axes of the LEDs perpendicular to a surface of a circuit board where the LEDs are disposed, the composite lens plate comprising:
a substrate; and
a plurality of refractive elements, disposed on the substrate and one-to-one corresponding to the LEDs, wherein each refractive element has a refractive property, the refractive elements are classified into at least two types of lenses according to the refractive property, the refractive elements of lenses of the same type have substantially the same refractive property, the refractive property of the refractive elements of lenses of one type is substantially different from the refractive property of the refractive elements of lenses of another type, each of the refractive elements of lenses of two types has an optic axis, the optic axes of the refractive elements of lenses of two types are parallel to the optic axes of the LEDs, the two types of lenses comprise a first type of lenses and a second type of lenses, surfaces of the refractive elements of the first type of lenses are each an elliptical curved surface, and surfaces of the refractive elements of the second type of lenses are each an elliptical curved surface having a cone-shaped concave top end.

17. A composite lens plate, applied in a light emitting diode (LED) lighting device having a plurality of LEDs, the composite lens plate comprising:
a substrate; and
a plurality of refractive elements, disposed on the substrate and one-to-one corresponding to the LEDs, wherein each refractive element has a refractive property, the refractive elements are classified into at least two types of lenses according to the refractive property, the refractive elements of lenses of the same type have substantially the same refractive property, and the refractive property of the refractive elements of lenses of one type is substantially different from the refractive property of the refractive elements of lenses of another type, the two types of lenses comprise a first type of lenses and a second type of lenses, surfaces of the refractive elements of the first type of lenses are each an elliptical curved surface having a cone-shaped concave top end, and surfaces of the refractive elements of the second type of lenses are each a combination of a semi-elliptical curved surface and a columnar body.

18. A composite lens plate, applied in a light emitting diode (LED) lighting device having a plurality of LEDs, each of the LEDs having an optic axis, the optic axes of the LEDs perpendicular to a surface of a circuit board where the LEDs are disposed, the composite lens plate comprising:
a substrate; and
a plurality of refractive elements, disposed on the substrate and one-to-one corresponding to the LEDs, wherein each refractive element has a refractive property, the refractive elements are classified into at least two types of lenses according to the refractive property, the refractive elements of lenses of the same type have substantially the same refractive property, the refractive property of the refractive elements of lenses of one type is substantially different from the refractive property of the refractive elements of lenses of another type, each of the refractive elements of lenses of two types has an optic axis, the optic axes of the refractive elements of lenses of two types are parallel to the optic axes of the LEDs, surfaces of the refractive elements of the first type of lenses are each an elliptical curved surface, and surfaces of the refractive elements of the second type of lenses are each a combination of a semi-elliptical curved surface and a columnar body.

19. A composite lens plate, applied in a light emitting diode (LED) lighting device having a plurality of LEDs, each of the LEDs having an optic axis, the optic axes of the LEDs perpendicular to a surface of a circuit board where the LEDs are disposed, the composite lens plate comprising:
a substrate; and
a plurality of refractive elements, disposed on the substrate and one-to-one corresponding to the LEDs, wherein each refractive element has a refractive property, the refractive elements are classified into at least two types of lenses according to the refractive property, the refractive elements of lenses of the same type have substantially the same refractive property, the refractive property of the refractive elements of lenses of one type is substantially different from the refractive property of the refractive elements of lenses of another type, each of the refractive elements of lenses of two types has an optic axis, the optic axes of the refractive elements of lenses of two types are parallel to the optic axes of the LEDs, surfaces of the refractive elements of the first type of lenses are each an elliptical curved surface having a cone-shaped concave top end, and surfaces of the refractive elements of the second type of lenses are each a combination of a semi-elliptical curved surface and a columnar body.

* * * * *